(12) United States Patent
Ma et al.

(10) Patent No.: US 12,257,694 B2
(45) Date of Patent: Mar. 25, 2025

(54) DOOR CONTROL APPARATUS

(71) Applicant: University of Cincinnati, Cincinnati, OH (US)

(72) Inventors: Ou Ma, Maineville, OH (US); Samuel King, Florence, KY (US); Yufeng Sun, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 375 days.

(21) Appl. No.: 17/831,838

(22) Filed: Jun. 3, 2022

(65) Prior Publication Data

US 2022/0388180 A1 Dec. 8, 2022

Related U.S. Application Data (60) Provisional application No. 63/196,254, filed on Jun. 3, 2021.

(51) Int. Cl.
| | |
|---|---|
| *B25J 15/00* | (2006.01) |
| *B25J 9/00* | (2006.01) |
| *B25J 9/10* | (2006.01) |
| *B25J 13/08* | (2006.01) |
| *B25J 19/02* | (2006.01) |

(52) U.S. Cl.
CPC ......... *B25J 15/0033* (2013.01); *B25J 9/0009* (2013.01); *B25J 9/10* (2013.01); *B25J 13/085* (2013.01); *B25J 19/023* (2013.01)

(58) Field of Classification Search
None
See application file for complete search history.

(56) References Cited

U.S. PATENT DOCUMENTS

| | | | | |
|---|---|---|---|---|
| 7,841,822 B2* | 11/2010 | Tygard | .................... | B66F 9/188 |
| | | | | 414/637 |
| 7,931,431 B2* | 4/2011 | Benedict | ................. | B63B 25/22 |
| | | | | 414/137.1 |
| 8,534,983 B2 | 9/2013 | Schoenfeld et al. | | |
| 10,913,160 B2* | 2/2021 | Deyle | .................. | G05D 1/0212 |

(Continued)

FOREIGN PATENT DOCUMENTS

JP 2008514504 A 5/2008

OTHER PUBLICATIONS

Screen captures from YouTube video clip entitled "Door opening robot", 8 pages, uploaded on Sep. 16, 2013, by user "Dennis Williams". Retrieved from Internet: https://www.youtube.com/watch?v=QnmFUS9kKV8&ab_channel=DennisWilliams.

(Continued)

*Primary Examiner* — Michael S Lowe
(74) *Attorney, Agent, or Firm* — Dinsmore & Shohl LLP (57) ABSTRACT

A door control apparatus is provided. The door control apparatus comprises a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame, and a door interaction arm that is disposed on a surface of the frame and extends substantially perpendicularly relative to the frame.

20 Claims, 9 Drawing Sheets

(56) References Cited

U.S. PATENT DOCUMENTS

| | | | |
|---|---|---|---|
| 11,413,761 B2* | 8/2022 | Simkins | B25J 9/161 |
| 11,648,661 B2* | 5/2023 | Hannig | B25J 15/0052 |
| | | | 414/744.5 |
| 11,919,157 B2* | 3/2024 | Iwamoto | B25J 9/126 |
| 2009/0204260 A1 | 8/2009 | Bryne et al. | |
| 2014/0200713 A1 | 7/2014 | Allen et al. | |

OTHER PUBLICATIONS

Screen captures from YouTube video clip entitled "Door opening robot", 6 pages, uploaded on Sep. 19, 2013, by user "chris manlapaz". Retrieved from Internet: https://www.youtube.com/watch?v=IXYZsG4hoho&ab_channel=chrismanlapaz.

Screen captures from YouTube video clip entitled "Electric Field Sensing Robot Plugs Itself In", 7 pages, uploaded on Jan. 13, 2010, by user "Hizook". Retrieved from Internet: https://www.youtube.com/watch?v=UCy1NnhOgbQ&ab_channel=Hizook.

Screen captures from YouTube video clip entitled "HRL: Door opening robot", 10 pages, uploaded on Jul. 8, 2009, by user "HealthcareRobotics". Retrieved from Internet: https://www.youtube.com/watch?v=_Z-shZD1sdU&ab_channel=HealthcareRobotics.

Screen captures from YouTube video clip entitled "Intel Labs' Marvin Robot Plugging Itself Into Wall Outlet", 9 pages, uploaded on Dec. 29, 2009, by user "Hizook". Retrieved from Internet: https://www.youtube.com/watch?v=BLnD22Myilw&ab_channel=Hizook.

Screen captures from YouTube video clip entitled "New Robot Technology 2013 Door Opening Robot", 11 pages, uploaded on Dec. 27, 2012, by user "TheTechnologist7000". Retrieved from Internet: https://www.youtube.com/watch?v=iMoM-HA3cE4&ab_channel=TheTechnologist7000.

Screen captures from YouTube video clip entitled "Intel's Marvin the Robot Plugs Itself in", 19 pages, uploaded on Sep. 28, 2009, by user "Mara Jade". Retrieved from Internet: https://www.youtube.com/watch?v=Jyl3ABJMRv4&ab_channel=MaraJade.

* cited by examiner

DOOR CONTROL APPARATUS

CROSS-REFERENCE TO RELATED APPLICATIONS

The present application claims the benefit of U.S. Provisional Application No. 63/196,254 filed Jun. 3, 2021, the entireties of which are hereby incorporated by reference.

TECHNICAL FIELD

The embodiments described herein generally relate to an apparatus for controlling interaction with, e.g., a self-closing door, and more particularly, to a door control apparatus that may be mounted on a vehicle and configured to autonomously unlock and open the self-closing door in order to facilitate navigation of the vehicle past this door.

BACKGROUND

Robots, autonomous vehicles, and other such machines are prevalent in residential and commercial settings. These machines are utilized to perform a wide range of tasks, e.g., from cleaning rooms to manufacturing and machining complex components for automobiles, computers, surveilling surroundings, cleaning floors, inspecting areas of interest, delivering items, and so forth. Regarding robots and autonomous vehicles in various human-centered environments, a difficult challenge involves effectively navigating from one location to another within these environments. In particular, an important part of navigating within these environments involves navigating through doors.

Accordingly, a need exists for an apparatus that enables vehicles to autonomously and effectively navigate through doors within various environments.

SUMMARY

In one embodiment, a system for controlling interaction of an apparatus with a door is provided. The system comprises a vehicle and a door control apparatus disposed on the vehicle, the door control apparatus including a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame. The door apparatus includes a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame, and a door interaction arm that is disposed on a surface of the frame and extends substantially perpendicularly relative to the frame.

In one embodiment, an apparatus for opening a door is provided. The apparatus comprises a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame, and a door interaction arm that is disposed on a surface of the frame and extends substantially perpendicularly relative to the frame.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Robots, autonomous vehicles, and comparable machines of varying capabilities are ubiquitous today. However, in various environments, these machines often face the challenge of having to navigate through one location within these environment to another. In particular, such navigation involves the need to autonomously open self-closing doors and navigate past these doors to various areas. Self-closing doors present a particular challenge because these doors tend to automatically close after opening, which require apparatuses to maintain these doors in an open position in order to navigate past these doors.

The door control apparatus of the present disclosure addresses and overcomes the deficiency. Embodiments of the door control apparatus of the present disclosure may serve to automatically identify a number of different doors within a particular vicinity of the door control apparatus, e.g., on an office floor, a residential facility, a manufacturing plant and so forth, travel with a particular vicinity of a particular door, interact with a latch (e.g., a regular latch for human operation) on the door in order to unlock it, and utilize various components or parts of the door control apparatus to open the door and facilitate navigation past the door. In embodiments, it is noted that the door control apparatus as described in the present disclosure may be permanently mounted or detachably positioned on vehicles of various types, e.g., wheelchairs, lift trucks, autonomous robots, and so forth. It is also noted that the door control apparatus includes a power supply component and a set of subcomponents that enable the charging of the power supply component with ease.

Figure 1A:
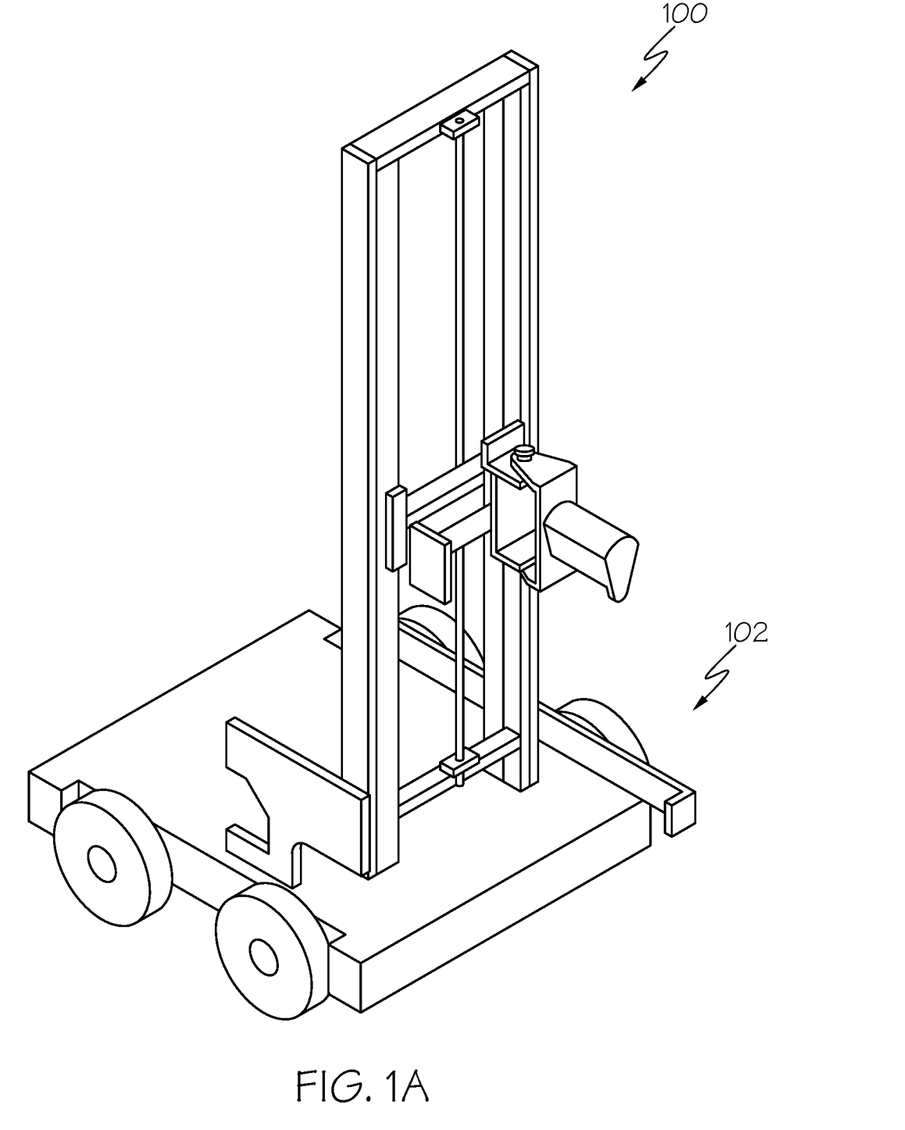
FIG. 1A depicts an example implementation of a door control apparatus of the present disclosure that is mounted on a vehicle, according to one or more embodiments described and illustrated herein.

FIG. 1A depicts an example implementation of a door control apparatus 100 of the present disclosure that is mounted on a vehicle 102, according to one or more embodiments described and illustrated herein. It is noted that the vehicle 102 may be representative of a variety of vehicles of different shapes, sizes, and dimensions. For example, the vehicle 102 may be one of autonomous vehicles, autonomous robots, manually operated vehicles, manually operated robots, wheelchairs, forklifts, and so forth. In embodiments, the door control apparatus 100 may be mounted on a wheel chair operating in a residential environment, an autonomous vehicle operating in a residential environment, and so forth. Other comparable vehicles are also contemplated. In embodiments, the door control apparatus 100 may be permanently attached to a surface of each of these vehicles. In embodiments, metal plates, steel plates, bolts and nuts, and so forth, may be utilized to affix or attach the door control apparatus 100 to an exterior or interior structure or surface of these vehicles. In embodiments, materials may be utilized to detachably attach to each of these vehicles.

Additionally, in embodiments, it is noted that the door control apparatus 100 may be communicatively coupled with one or more components of the vehicle (e.g., the vehicle 102) upon which the door control apparatus 100 is permanently affixed or detachably attached. In embodiments, the door control apparatus 100 may include a controller (not shown in FIG. 1A), memory (not shown in FIG. 1A), and a plurality of force sensors, camera, proximity sensors, and so forth (not shown in FIG. 1A). In embodiments, the data collected by the force sensors, camera, proximity sensors, and so forth may be obtained and shared by the door control apparatus 100 with the vehicle 102. The data collected by these sensors may also be utilized by the controller to control operation of various components of the door control apparatus 100 in order to facilitate, e.g., opening a door, holding it open, and enabling a vehicle to navigate past the door. The steps performed to interact with a door in order to open the door will be described in detail later in in this disclosure.

In embodiments, the door control apparatus 100 may include a power supply component (not shown in FIG. 1A) that may be detachably attached to a portion of the door control apparatus 100 and may charged by coupling to a standard power outlet, e.g., a standard three-port power outlet. Other comparable outlets are also contemplated. In embodiments, the door control apparatus 100 may utilize one or more sensors, e.g., a camera, to identify one or more power outlet locations in a particular environment (e.g., residential property, industrial facility, and so forth) and facilitate navigation of a vehicle, e.g., the vehicle 102, towards the one or more power outlet locations for charging. It is noted that the actions performed to charge the power supply component are also described in detail later on in this disclosure.

Figure 1B:
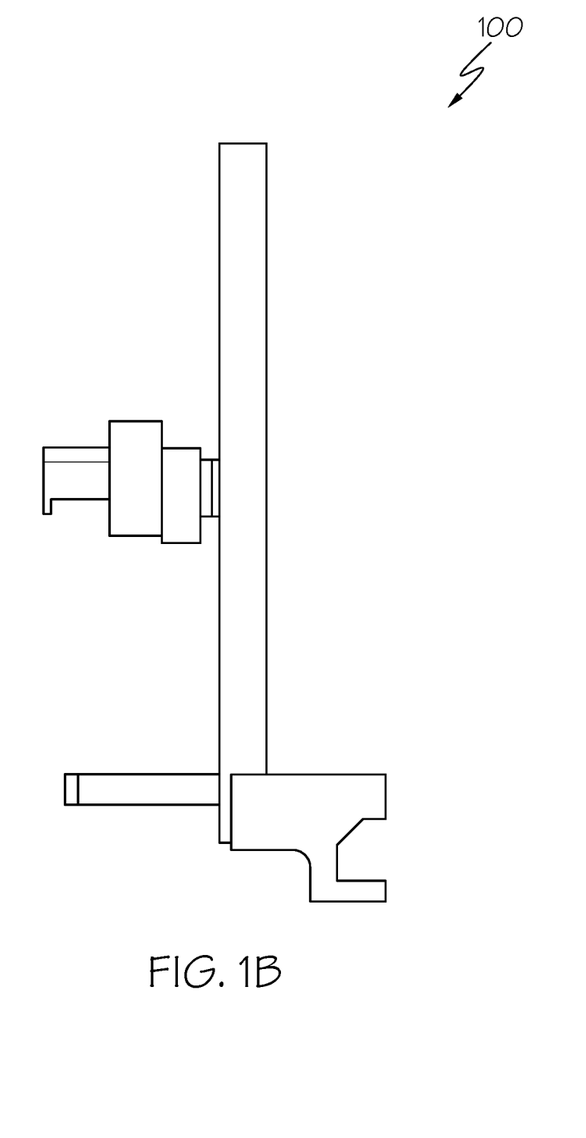
FIG. 1B depicts a side view of the example implementation of the door control apparatus of the present disclosure, according to one or more embodiments described and illustrated herein.

FIG. 1B depicts a side view of the example implementation of the door control apparatus 100 of the present disclosure, according to one or more embodiments described and illustrated herein. The door control apparatus 100 may be formed of aluminum, metal, metal alloys, steel, and so forth. As illustrated, the door control apparatus 100 may be designed to be compact such that the door control apparatus 100 may be stably and effectively installed on one or more surfaces of vehicles of various shapes, sizes, and dimensions. It is further noted that, in embodiments, the door control apparatus 100 may be designed and customized to fit a variety of shapes, sizes, and dimensions.

Figure 1C:
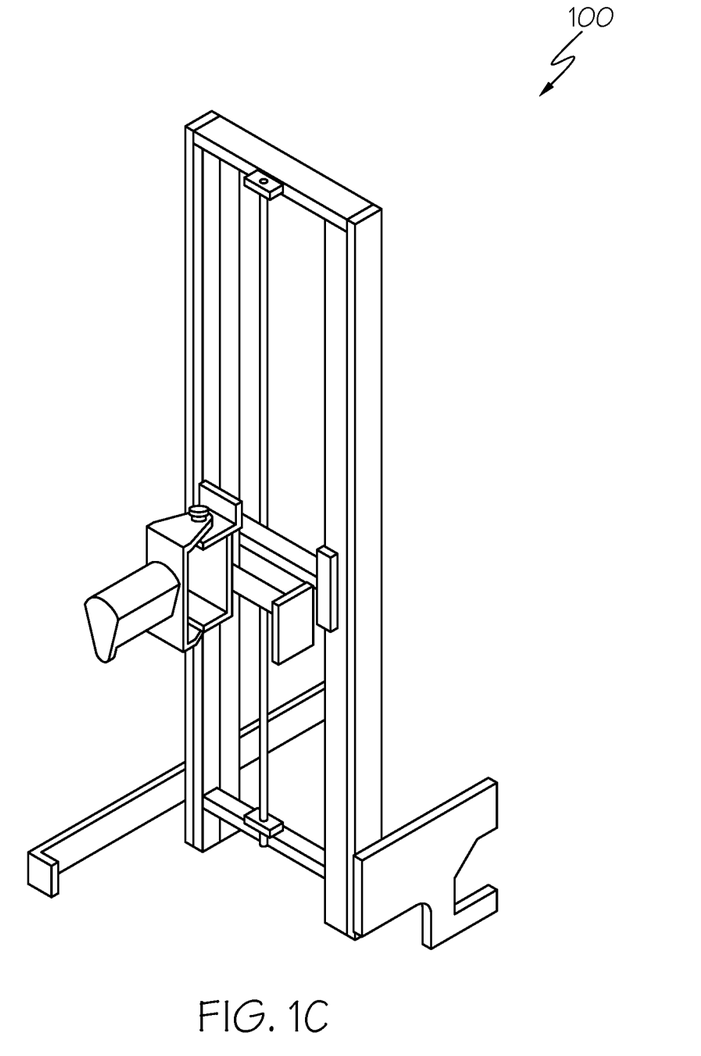
FIG. 1C depicts a three dimensional view of the example implementation of the door control apparatus of the present disclosure, according to one or more embodiments described and illustrated herein.

FIG. 1C depicts a three dimensional view of the example implementation of the door control apparatus 100 of the present disclosure, according to one or more embodiments described and illustrated herein.

Figure 2A:
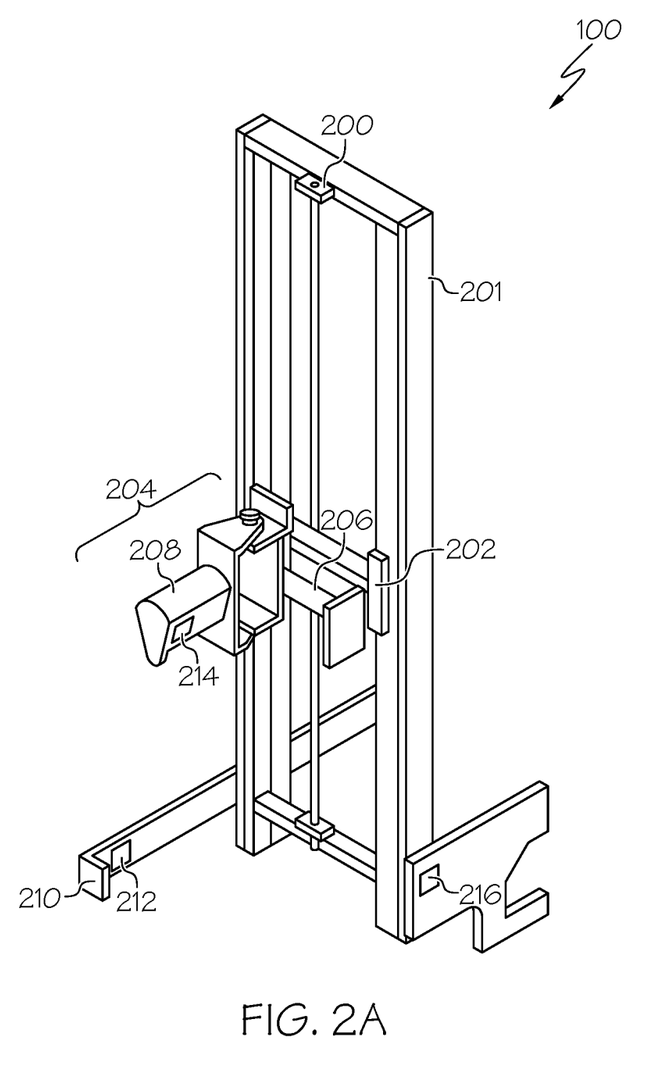
FIG. 2A depicts a three dimensional view of the example implementation of the door control apparatus of the present disclosure with a plurality of subcomponents disposed thereupon, according to one or more embodiments described and illustrated herein.

FIG. 2A depicts a three dimensional view of the example implementation of the door control apparatus 100 of the present disclosure with a plurality of subcomponents disposed thereupon, according to one or more embodiments described and illustrated herein. In embodiments, as illustrated in FIG. 2A, the door control apparatus 100 may include a first actuator 200, a second actuator 202, and a frame 201. In embodiments, the frame 201 may be composed or formed of aluminum, metal, metal alloys, steel, and other such comparable materials. The frame 201 may include rails that enable vertical movement of one or more subcomponents of the door control apparatus 100 from a top portion to a bottom portion of the frame 201. The movement of the one or more subcomponents of the door control apparatus 100 is controlled by the first actuator 200. It is further noted that, in embodiments, an additional actuator (not shown) may be installed and will serve to control operation of the power supply component, e.g., as part of an autonomous charging feature.

Each of the first actuator 200 and the second actuator 202 may be controlled by a controller 216. It is noted that the location of the controller 216 of FIG. 2A is for illustrative purposes only. In embodiments, the controller 216 may be positioned or installed on other locations of the door control apparatus 100 as well. In embodiments, the controller 216 may be communicatively coupled with each of the first actuator 200 and the second actuator 202 via a wired connection.

In embodiments, the door control apparatus 100 also includes a door control arm 204 that comprises door control base portion 206 and a door handle contact protrusion 208. It is noted that the door control arm 204 is integrated as a moving part of the frame 201 and is configured to move vertically between a top frame portion and a bottom frame portion and also to move horizontally between the left side and right side of the frame 201. The door control arm 204 includes a door handle contact protrusion 208 with a curve shaped end part that is configured to engage door latches. As illustrated in FIG. 2A, the door handle contact protrusion 208 may extend substantially perpendicularly relative to the frame 201 of the door control apparatus 100. Further, the door handle contact protrusion 208 may include one or more cameras mounted on a top portion of the door handle contact protrusion 208 for identifying and door handle and power outlet. In embodiments, the one or more cameras may be mounted on other parts of the door control apparatus 100 as well, e.g., in order to improve situational awareness by gathering additional data related to a particular environment in which the door control apparatus 100 may be located. It is noted that, in embodiments, the front portion of the door handle contact protrusion 208 is covered with soft material that prevents any scratching on the door surface or hard contact with the door handle.

The one or more cameras may capture images or a live video stream of the relative location of the door control apparatus 100 within a particular environment in real time, e.g., within a residential building, a public building, an industrial facility, and so forth. In embodiments, an example force sensor 214 may also be positioned on the door handle contact protrusion 208. In embodiments, additional sensors in the form of cameras, force sensors, proximity sensors, and so forth, may be positioned on the door control base portion 206, the door handle contact protrusion 208, and/or other parts of the door control apparatus 100 such as, e.g., other parts of the frame 201. In embodiments, each of the sensors may be communicatively coupled with the controller 216. Data obtained from these sensors may be analyzed by the controller 216 and stored in memory of the door control apparatus 100. In embodiments, the data obtained from these sensors may be transmitted wirelessly to one or more external servers.

In embodiments, the door control apparatus 100 also includes a couple of door interaction arms 210 that may be disposed on a surface (e.g., a bottom surface) of the frame 201 to help open a self-closing door. Each of the door interaction arms 210 may each include an example force sensor 212. In embodiments, when opening a self-closing door, one of the door interaction arms 210 may rotate 90° from its vertical default configuration to the horizontal configuration, which is perpendicular to the frame 201. Each of the door interaction arms 210 also includes an example force sensor 212. In embodiments, the controller 216 of the door control apparatus 100 may utilize both the door control arm 204 (and all subcomponents of the door control arm 204) to unlatch a door, pull or push the door to configure the door in a slightly open, and then use one of the two door-holding bars to hold the door open for the purpose of enabling navigation past the door in an efficient and autonomous manner. Once at least one of the door interaction arms 210 holds the door, the door handle contact protrusion 208 can release the door handle. Thereafter, a vehicle, e.g., the vehicle 102 upon which the door control apparatus 100 may be mounted, can navigate past the doorway while at least one of the door interaction arms 210 holds the door open.

Figure 2B:
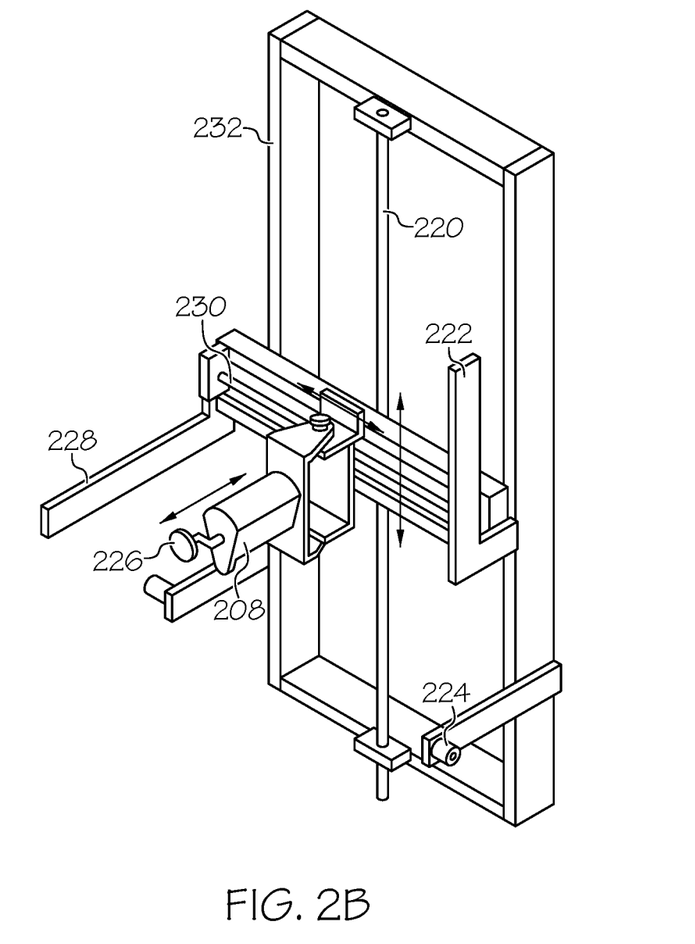
FIG. 2B depicts an example embodiment of a top portion of the door control apparatus with emphasis on particular structural components of the door control apparatus, according to one or more embodiments described and illustrated herein.

FIG. 2B depicts an example embodiment of a top portion of the door control apparatus 100 with emphasis on particular structural components of the door control apparatus 100, according to one or more embodiments described and illustrated herein. As illustrated, in embodiments, the top portion of the door control apparatus 100 includes a drive shaft 220 that facilitates movement of the door control arm 204 in a vertical direction, namely from a top frame portion to the bottom frame portion and from the bottom frame portion to the top frame portion, as described above. FIG. 2B also illustrates an example fixed block 224. The top portion also includes an example drive shaft 230 that enables the door control arm 204 to move in a lateral direction, namely from the left-hand side to the right-hand side or vise versa. These two controlled movements (namely, in the vertical and horizontal directions) are used to align the door control arm 204 with a door handle whose relative position with respect to the door may vary from one door to another.

In embodiments, the top portion as illustrated in FIG. 2B also includes an example frame sliding rail 232 on each side of the frame, as described above, that may be utilized by the door control apparatus 100 to move from a top frame portion to the bottom portion of the door control apparatus 100. Additionally, as illustrated, the top portion includes an example power supply plugin 226 (e.g., a standard 120V power plugin) that may be coupled to the door handle contact protrusion 208.

Figure 3:
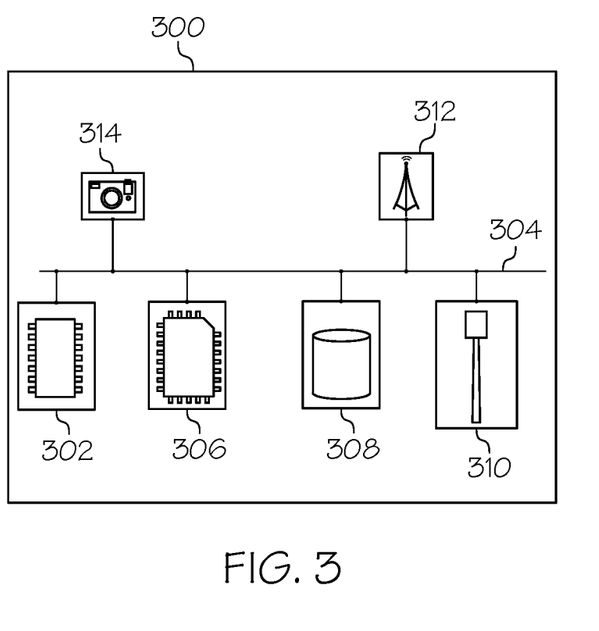
FIG. 3 schematically depicts non-limiting components of the devices of present disclosure, according to one or more embodiments described and illustrated herein.

FIG. 3 schematically depicts non-limiting components of the devices of present disclosure, according to one or more embodiments described and illustrated herein. In particular, FIG. 3 schematically depicts a door control system 300 that includes the subcomponents that may be utilized to control operation of the door control apparatus 100 of the present disclosure. The door control system 300 may be installed as part of the door control apparatus 100, which may be installed on a vehicle, e.g., the vehicle 102 as illustrated in FIG. 1

The door control system 300 may include a controller 302. The controller 216 may be any device capable of executing machine readable and executable instructions. Accordingly, the controller 302 may be an integrated circuit, a microchip, a computer, or any other computing device. The controller 302 may serve the role of a decision making module that is powered by or which implements a reinforcement learning based model as described in the present disclosure. The door control apparatus 100 may utilize the reinforcement learning based model to perform various actions.

The controller 302 may be coupled to a communication path 304 that provides signal interconnectivity between various modules of the door control system 300. Accordingly, the communication path 304 may communicatively couple any number of processors (e.g., comparable to the controller 302) with one another, in addition to coupling all of the various subcomponents of the door control apparatus 100. Specifically, each of the subcomponents may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication path 304 may be formed from any medium that is capable of transmitting a signal such as, for example, conductive wires, conductive traces, or the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Accordingly, the communication path 404 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The door control system 300 may include one or more memory modules 306, which is coupled to the communication path 304. The one or more memory modules 306 may comprise RAM, ROM, flash memories, hard drives, or any device capable of storing machine readable and executable instructions such that the machine readable and executable instructions can be accessed by the controller 302. The machine readable and executable instructions may comprise logic or algorithm(s) written in any programming language of any generation (e.g., 1GL, 2GL, 3GL, 4GL, or 5GL) such as, for example, machine language that may be directly executed by the controller 216 or assembly language, object-oriented programming (OOP), scripting languages, microcode, etc., that may be compiled or assembled into machine readable and executable instructions and stored on the one or more memory modules 306. Data relating to the moving agents may be stored such as, e.g., location data around the door control apparatus 100, environment data, time data, speed data of a vehicle upon which the door control apparatus 100 is mounted, one or more images or a live video stream that is captured by one or more cameras that are mounted on the door control apparatus 100, the status parameters of the controller 216, and so forth.

Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The door control system 300 may include one or more sensors clusters 308, e.g., the force sensors 212, 214, cameras, and so forth. Each of the one or more sensors clusters 308 are coupled to the communication path 304 and communicatively coupled to the controller 302. In embodiments, the one or more sensor clusters 308, in addition to force sensors 212 and 214 and cameras, may include motion sensors, accelerometers, gyroscopes, proximity sensors, and so forth.

In embodiments, still referring to FIG. 3, the door control system 300 includes a wireless device 310 coupled to the communication path 304 such that the communication path 304 communicatively couples the wireless device 310 to other modules of the door control system 300. The wireless device 310 is configured to receive signals from global positioning system satellites. Specifically, in one embodiment, the wireless device 310 includes one or more conductive elements that interact with electromagnetic signals transmitted by global positioning system satellites. The received signal is transformed into a data signal indicative of the location (e.g., latitude and longitude) of the wireless device 310 or an object positioned near the wireless device 310 by the controller 302. The location information may be include the data regarding the location of the door control apparatus 100. It is noted that, in embodiments, the wireless device 310 may be included as part of the vehicle 102 upon which the door control apparatus 100 is permanently mounted or detachably installed.

The door control system 300 may include network interface hardware 312 for communicatively coupling the door control system 300 with the various external devices, systems, and servers, e.g., via a communication network (not shown). The network interface hardware 312 is coupled to the communication path 304 such that the communication path 304 communicatively couples the network interface hardware 312 to other subcomponents of the door control system 300. The network interface hardware 312 may be any device capable of transmitting and/or receiving data via a wireless network, e.g., the communication network. Accordingly, the network interface hardware 312 may include a communication transceiver for sending and/or receiving data according to any wireless communication standard. For example, the network interface hardware 312 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 312 includes a WiFi transceiver that enables the door control system 300 to transmit and receive information via WiFi.

The door control system 300 also includes an example camera 314 that may be mounted on the door handle contact protrusion 208. The camera 314 may have any resolution. In some embodiments, one or more optical components, such as a micro lens (for close-distance alignment), fish-eye lens (for far-distance door detection), or any other type of lens may be optically coupled to the camera 314. In embodiments, the camera 314 may have a broad angle feature that enables capturing digital content within a 150 degree arc range. Alternatively, the camera 314 may have a narrow angle feature that enables capturing digital content within a narrow arc range, e.g., 60 degree to 90 degree arc range. In embodiments, the one or more cameras may be capable of capturing high resolution images.

It is noted that FIGS. 4A-4D illustrate the various steps that may be performed by the door control apparatus 100 to enable the unlocking and opening of a door for the purpose of facilitating navigation past the door, according to one or more embodiments described and illustrated herein. It is noted that FIGS. 4A-4D depict a bird's eye view of various actions that may be performed by the door control apparatus 100 that may be mounted on the vehicle 102, according to one or more embodiments described and illustrated herein.

Figure 4A:
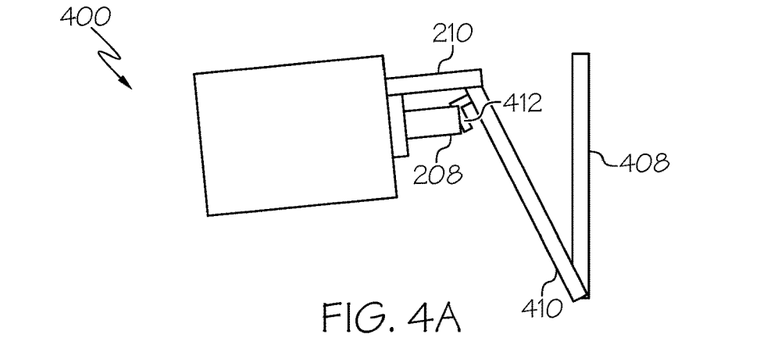
FIG. 4A depicts an example action performed by the door control apparatus of the present disclosure, according to one or more embodiments described and illustrated herein.

FIG. 4A depicts an example action 400 performed by the door control apparatus 100 of the present disclosure, according to one or more embodiments described and illustrated herein. In embodiments, the door control apparatus 100 of the present disclosure may be permanently attached to or detachably affixed to, e.g., the vehicle 102. In embodiments, upon receiving instructions from the controller 216, the door control apparatus 100 may facilitate identification of a door 410 (e.g., a self-closing door) within a particular vicinity of the vehicle 102, in additional to a door handle 412 positioned on the door 410. In embodiments, one or more cameras position on the door handle contact protrusion 208 of the door control apparatus 100 may capture one or more images or a live video stream of an environment within, e.g., 5-10 feet radius of the apparatus, and transfer these images to the controller 216, which may analyze these images and/or live video stream and facilitate movement of the vehicle 102 and the door control apparatus 100 towards the door 410.

Upon traveling within a certain vicinity of the door 410, the door handle contact protrusion 208 may contact and engage the door handle 412. In particular, the curved shaped end part of the door handle contact protrusion 208 may contact and engage with the door handle 412 so as to move the door handle 412 from a first position to a second position. In embodiments, upon contacting the door handle 412, the controller 216 may transmit a signal to the door handle contact protrusion 208 to perform a twisting or downwards motion, in response to which the door handle contact protrusion 208 may move the door handle 412 from the first position to the second position, thereby unlatching the door 410. Thereafter, the door control apparatus 100 may also facilitate movement in a direction that is away from a door frame 408, which in turn enables the door 410 to be opened. In embodiments the example force sensor 214 position on the door handle contact protrusion 208 may gauge or collect, in real time, force applied on the door handle contact protrusion 208 as a result of engagement with the door handle 412. In embodiments, if the force exceeds a particular threshold value, an audio alarm may be output and/or the engagement of the door handle contact protrusion 208 with the door handle 412 may be temporarily halted or modified.

Thereafter, at least one of the door interaction arms 210 may contact a bottom portion of the door 410 and pull the door 410 such that the door 410 may be moves from a third position to a fourth position, e.g., from a closed position to an open position, in response to one or more instructions from the controller 216. It is noted that, in embodiments, based on one or more instructions communicated by the controller 216, one or more of the door interaction arms 210 may be configured to facilitate movement of the door 410 from the third position to the fourth position, e.g., only after the door handle 412 is unlatched from the first position to the second position.

Figure 4B:
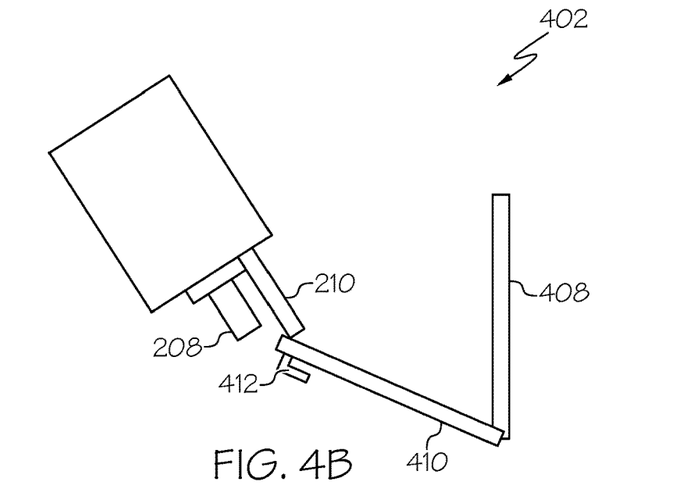
FIG. 4B depicts one of the door interaction arms in operation, according to one or more embodiments described and illustrated herein.

FIG. 4B depicts one of the door interaction arms 210 in operation, according to one or more embodiments described and illustrated herein. In particular, FIG. 4B depicts an example action 402 in which one of the door interaction arms 210 pulls the door 410 away from the door frame 408 (e.g., from the third position to a fourth position) by a particular magnitude. It is noted that as the door 410 is moved, the example force sensor 212, which may be positioned on each of the door interaction arms 210, may collect data on the force that is applied on at least one of the door interaction arms 210 as a result of contact with the door 410. In embodiments, if the force exceeds a particular threshold value, various actions may be performed. For example, an audio alarm may be output or the contact of the door interaction arms 210 with the door 410 may be temporarily stopped.

Figure 4C:
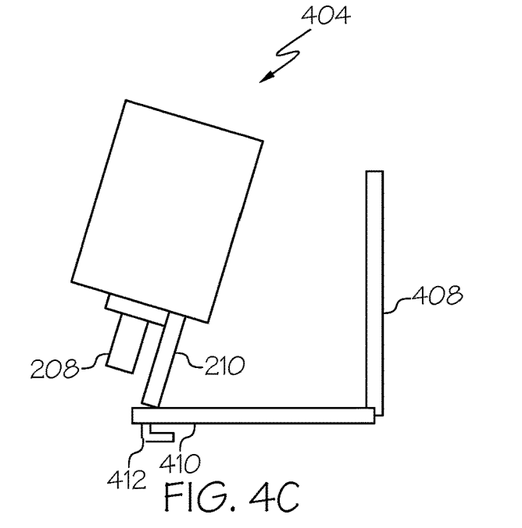
FIG. 4C depicts an example action of at least one of the door interaction arms completing the movement of the door to a completely open position, according to one or more embodiments described and illustrated herein.

FIG. 4C depicts an example action 406 of at least one of the door interaction arms 210 completing the movement of the door 410 to a completely open position, according to one or more embodiments described and illustrated herein. In particular, as illustrated, at least one of the door interaction arms 210 may be utilized to complete the movement of the door 410 to the open position (e.g., fourth position).

Figure 4D:
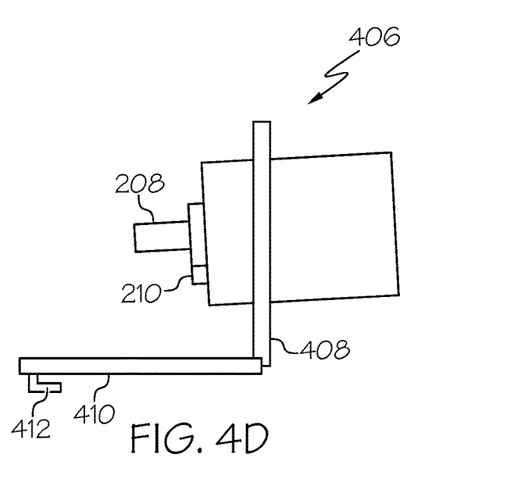
FIG. 4D depicts an example action of the door control apparatus assisting the vehicle, upon which the door control apparatus is positioned, in navigating past the door, according to one or more embodiments described and illustrated herein.

FIG. 4D depicts an example action 406 of the door control apparatus 100 assisting the vehicle 102, upon which the door control apparatus 100 is positioned, in navigating past the door 410. In particular, as illustrated in FIG. 4D, at least one of the door interaction arms 210 may maintain contact with the door 410 in order to ensure that the door 410 remains open while the vehicle 102 travels in a forward direction and past the door 410.

Figure 5:
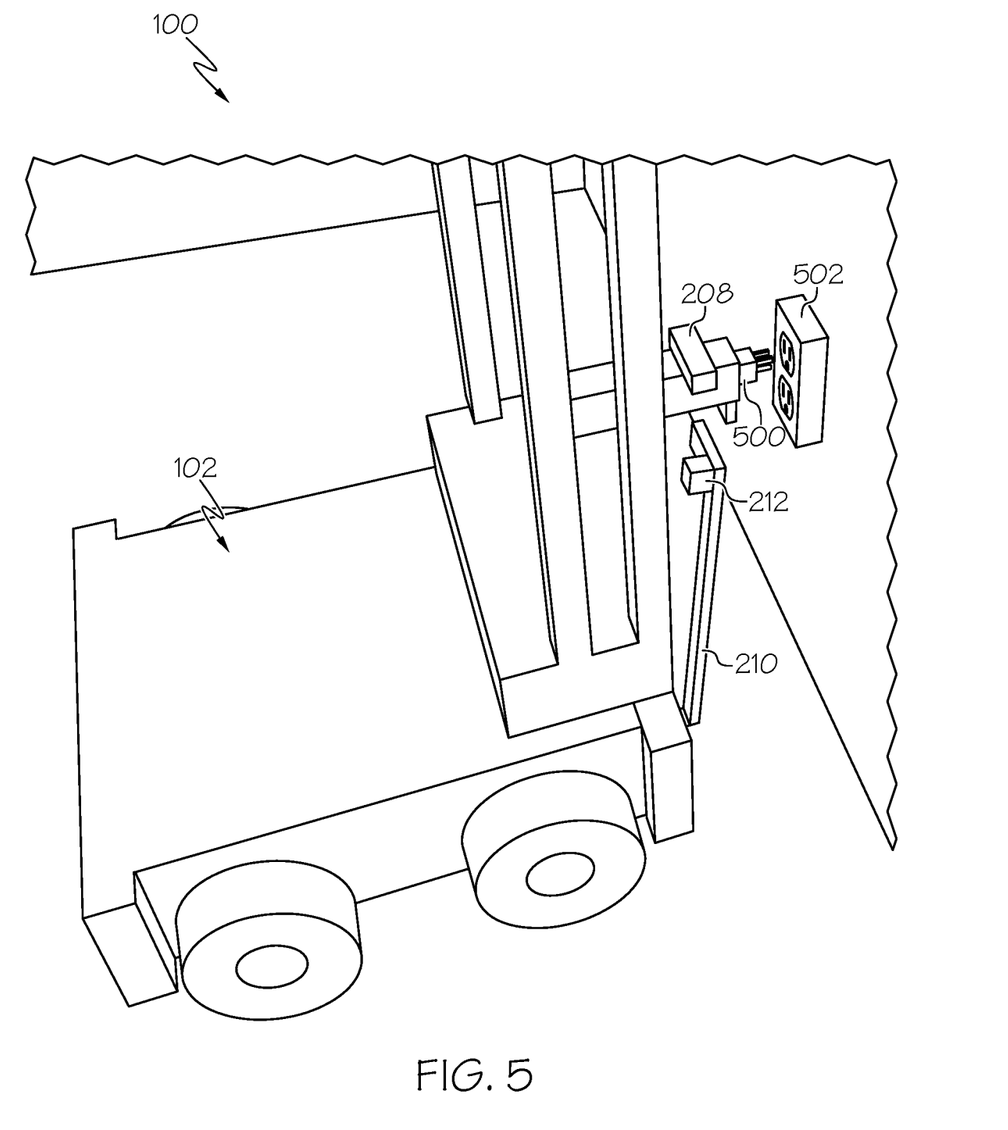
FIG. 5 depicts an example power supply component that may be couplable with the door handle contact protrusion, according to one or more embodiments described and illustrated herein.

FIG. 5 depicts an example power supply component 500 that may be couplable with the door handle contact protrusion 208. In particular, FIG. 5 illustrates the vehicle 102 and the door control apparatus 100 that is disposed on an exterior surface of the vehicle 102. FIG. 5 further illustrates the example power supply component 500 that may be detachably affixed or attached to the end of the door handle contact protrusion 208. The example power supply component 500 may be a standard 3 pronged power supply component that may be connected to an example power socket 502, e.g., a standard 3 port power socket. It is noted that one or more cameras mounted on the door control apparatus 100 may capture images and a live video stream that enable the apparatus to identify a location of one or more power sockets in a particular vicinity of the door control apparatus 100 and facilitate movement of the apparatus in order to connect the example power supply component 500 to the example power socket 502.

Figure 6A:
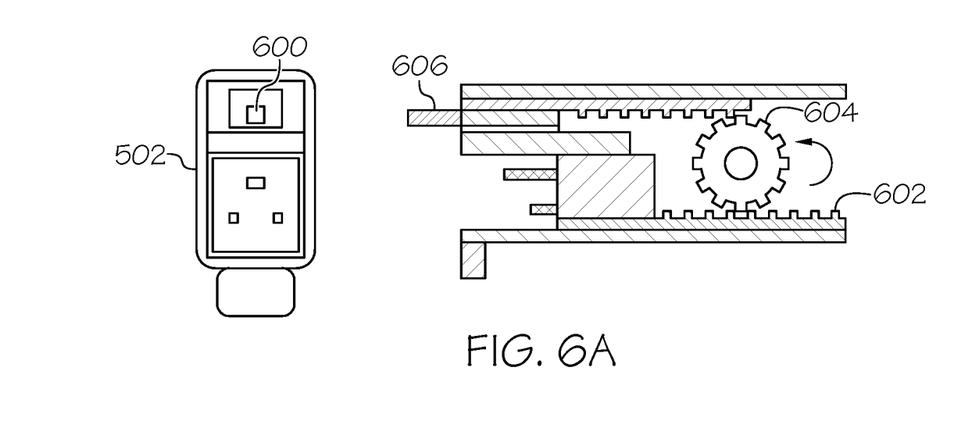
FIG. 6A depicts operation of a mechanical finger positioned on the door control apparatus, according to one or more embodiments described and illustrated herein.

FIG. 6A depicts operation of a mechanical finger 606 positioned on the door control apparatus 100, according to one or more embodiments described and illustrated herein. In particular, FIG. 6A depicts the internal subcomponents of the example power supply component 500 as illustrated in FIG. 5, namely a motor 604 that operates on a slider 602 that is coupled to both the example mechanical finger 606 and the example power supply component 500. The motor 604 may rotate on the slider 602 in a particular direction in order to facilitate forward movement or extension of the mechanical finger 606 outwards, as illustrated in FIG. 6A. In embodiments, the mechanical finger 606 may operate in various residential and commercial environments, e.g., to select a button 600. In embodiments, the button 600 may be an elevator button that is associated with a floor on an elevator. It is noted that, in embodiments, the door control apparatus 100 as described above may be installed as part of a wheelchair to assist handicapped individuals travel to various locations with more ease.

Figure 6B:
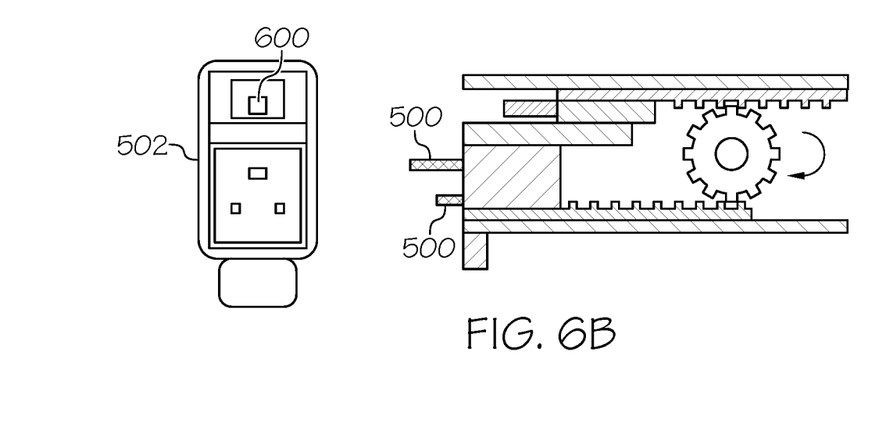
FIG. 6B depicts operation of the example power supply component positioned on the door control apparatus, according to one or more embodiments described and illustrated herein.

FIG. 6B depicts operation of the example power supply component 500 positioned on the door control apparatus 100, according to one or more embodiments described and illustrated herein. In particular, FIG. 6B depicts the motor 604 rotating on the slider 602 in a particular direction in order to enable the example power supply component 500 to extend outwards and connect with the example power socket 502. In embodiments, the controller 216 may be trained on the reinforcement learning based model to determine a set of actions that enable the door control apparatus 100 to recharge the example power supply component 500 efficiently and effectively. The set of actions may include efficiently identifying a number of power sockets within a particular environment, distances between the door control apparatus 100 and each of these power sockets, heights of these power sockets, and so forth. In embodiments, based on this information, the controller 216 may identify a set of actions to be performed to enable the door control apparatus 100 to navigate to the closest power socket and charge the example power supply component 500.

It is further noted that the controller 216 may utilize the reinforcement learning based model to determine set of actions that enable the door control apparatus 100 to effectively and efficiently navigate unlatch, open, and navigate past a door.

It should now be understood that the embodiments of the present disclosure are directed to a system and an apparatus for interacting with doors. The system includes a vehicle and a door control apparatus disposed on the vehicle, the door control apparatus including a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame. The door apparatus includes a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame, and a door interaction arm that is disposed on a surface of the frame and extends substantially perpendicularly relative to the frame.

In a first aspect, a system comprises a vehicle and a door control apparatus disposed on the vehicle. The door control apparatus includes a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame, and a door interaction arm that is disposed on a surface of the frame and extends substantially perpendicularly relative to the frame.

In a second aspect, the system of the first aspect, wherein the door handle contact protrusion is configured to move laterally such that the door handle contact protrusion moves from a first side end of the frame to a second side end of the frame.

In a third aspect, the system of the first aspect or the second aspect, wherein the door control arm includes a camera.

In a fourth aspect, the system of any of the first to the third aspects, wherein the door interaction arm includes a force sensor for detecting a magnitude of force applied thereupon.

In a fifth aspect, the system of any of the first to the fourth aspects, further comprising a power supply component.

In a sixth aspect, the system of the fifth aspect, wherein the power supply component is couplable with the door handle contact protrusion.

In a seventh aspect, the system of any of the first to the sixth aspects, wherein the frame is composed of aluminum.

In an eighth aspect, the system of any of the first to the seventh aspects, further comprising trimming the nodal graph based on constraints on goods of the goods agents and services of the requests.

In a ninth aspect, the system of any of the first to the eighth aspects, wherein the door handle contact protrusion having the curve shaped end part is configured to contact a door handle that is external to the door control apparatus, and move the door handle from a first position to a second position responsive to an instruction from the processor.

In a tenth aspect, the door control apparatus comprises a processor, a frame that includes a top frame portion and a bottom frame portion, a door control arm that is integrated as part of the frame and configured to move vertically between the top frame portion and the bottom frame portion, the door control arm including a door handle contact protrusion having a curve shaped end part, the door handle contact protrusion extending substantially perpendicularly relative to the frame, and a door interaction arm that is disposed on a surface of the frame and extends substantially perpendicularly relative to the frame.

In an eleventh aspect, the door control apparatus of the tenth aspect, wherein the door handle contact protrusion is configured to move laterally such that the door handle contact protrusion moves from a first side end of the frame to a second side end of the frame.

In a twelfth aspect, the door control apparatus of the tenth or the eleventh aspect, wherein the door control arm includes a camera and a force sensor for detecting a magnitude of force applied thereupon.

In a thirteenth aspect, the door control apparatus of any of the tenth to the twelfth aspect, further comprising a power supply component.

In a fourteenth aspect, the door control apparatus of the thirteenth aspect, wherein the power supply component is couplable with the door handle contact protrusion.

In a fifteenth aspect, the door control apparatus of any of the tenth to the fourteenth aspects, wherein the frame is composed of aluminum.

In a sixteenth aspect, the door control apparatus of any of the tenth to the fifteenth aspects, wherein the door interaction arm that extends substantially perpendicularly relative to the frame includes a force sensor disposed thereupon.

In a seventeenth aspect, the door control apparatus of any of the tenth to the sixteenth aspects, wherein the door handle contact protrusion having the curve shaped end part is configured to contact a door handle that is external to the door control apparatus, and move the door handle from a first position to a second position responsive to an instruction from the processor.

In an eighteenth aspect, the door control apparatus of the seventeenth aspect, wherein the door interaction arm is configured to contact a door upon which the door handle is positioned and facilitate movement of the door from a third position to a fourth position.

In a nineteenth aspect, the door control apparatus of the eighteenth aspect, wherein the door interaction arm is configured to facilitate movement of the door from the third position to the fourth position after the door handle is moved from the first position to the second position.

In a twentieth aspect, the door control apparatus of the seventeenth aspect, wherein the instruction from the controller is based on reinforcement learning based training for interacting with doors.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system comprising:
   a vehicle; and
   a door control apparatus disposed on the vehicle, the door control apparatus including:
   a controller,
   a frame that includes a top frame portion, a bottom frame portion, a first sliding rail disposed on a first side of the frame, and a second sliding rail disposed on a second side of the frame, the first and second sliding rails connecting the top frame portion and the bottom frame portion of the frame,
   a door control arm that is integrated as part of the frame and configured to move vertically between the top frame portion and the bottom frame portion along the first and second sliding rails, the door control arm including a door handle contact protrusion having an end part configured to engage a door handle, the door handle contact protrusion extending substantially perpendicularly relative to the frame, and
   a door interaction arm that is disposed on a surface of the frame and extends substantially perpendicularly relative to the frame.

2. The system of claim 1, wherein the door handle contact protrusion is configured to move laterally such that the door handle contact protrusion moves from a first side end of the frame to a second side end of the frame.

3. The system of claim 1, wherein the door control arm includes a camera.

4. The system of claim 1, wherein the door interaction arm includes a force sensor for detecting a magnitude of force applied thereupon.

5. The system of claim 1, further comprising a power supply component.

6. The system of claim 5, wherein the power supply component is couplable with the door handle contact protrusion.

7. The system of claim 1, wherein the frame is composed of aluminum.

8. The system of claim 1, wherein the door interaction arm that extends substantially perpendicularly relative to the frame includes a force sensor disposed thereupon.

9. The system of claim 1, wherein the door handle contact protrusion having the end part is configured to:
   contact a door handle that is external to the door control apparatus; and
   move the door handle from a first position to a second position responsive to an instruction from a processor.

10. A door control apparatus comprising:
    a controller,
    a frame that includes a top frame portion, a bottom frame portion, a first sliding rail disposed on a first side of the frame, and a second sliding rail disposed on a second side of the frame, the first and second sliding rails connecting the top frame portion and the bottom frame portion of the frame,
    a door control arm that is integrated as part of the frame and configured to move vertically between the top frame portion and the bottom frame portion along the first and second sliding rails, the door control arm including a door handle contact protrusion having an end part configured to engage a door handle, the door handle contact protrusion extending substantially perpendicularly relative to the frame, and
    a door interaction arm that is disposed on a surface of the frame and extends substantially perpendicularly relative to the frame.

11. The door control apparatus of claim 10, wherein the door handle contact protrusion is configured to move laterally such that the door handle contact protrusion moves from a first side end of the frame to a second side end of the frame.

12. The door control apparatus of claim 10, wherein the door control arm includes a camera and a force sensor for detecting a magnitude of force applied thereupon.

13. The door control apparatus of claim 10, further comprising a power supply component.

14. The door control apparatus of claim 13, wherein the power supply component is couplable with the door handle contact protrusion.

15. The door control apparatus of claim 10, wherein the frame is composed of aluminum.

16. The door control apparatus of claim 10, wherein the door interaction arm that extends substantially perpendicularly relative to the frame includes a force sensor disposed thereupon.

17. The door control apparatus of claim 10, wherein the door handle contact protrusion having the end part is configured to:
    contact a door handle that is external to the door control apparatus; and
    move the door handle from a first position to a second position responsive to an instruction from the controller.

18. The door control apparatus of claim 17, wherein the door interaction arm is configured to contact a door upon which the door handle is positioned and facilitate movement of the door from a third position to a fourth position.

19. The door control apparatus of claim 18, wherein the door interaction arm is configured to facilitate movement of the door from the third position to the fourth position after the door handle is moved from the first position to the second position.

20. The door control apparatus of claim 17, wherein the instruction from the controller is based on reinforcement learning based training for interacting with doors.

* * * * *